(12) United States Patent
Hudson

(10) Patent No.: US 10,208,598 B2
(45) Date of Patent: *Feb. 19, 2019

(54) ROTARY ENERGY CONVERTER WITH RETRACTABLE BARRIER

(71) Applicant: Scott Hudson, McLean, VA (US)

(72) Inventor: Scott Hudson, McLean, VA (US)

(73) Assignee: Scott Hudson, Reston, VA (US)

(*) Notice: Subject to any disclaimer, the term of this patent is extended or adjusted under 35 U.S.C. 154(b) by 177 days.

This patent is subject to a terminal disclaimer.

(21) Appl. No.: 15/213,785

(22) Filed: Jul. 19, 2016

(65) Prior Publication Data
US 2016/0326875 A1    Nov. 10, 2016

Related U.S. Application Data

(63) Continuation of application No. 14/107,441, filed on Dec. 16, 2013, now Pat. No. 9,394,790, which is a
(Continued)

(51) Int. Cl.
F02B 53/00    (2006.01)
F02B 53/04    (2006.01)
(Continued)

(52) U.S. Cl.
CPC .......... F01C 21/0809 (2013.01); F01C 1/321 (2013.01); F01C 1/322 (2013.01);
(Continued)

(58) Field of Classification Search
CPC ...... F01C 21/0809; F01C 1/321; F01C 1/322; F01C 1/40; F01C 21/104; F02B 53/00;
(Continued)

(56) References Cited

U.S. PATENT DOCUMENTS

| 719,222 | A | 1/1903 | Huyck |
| 997,895 | A | 7/1911 | Beeson |

(Continued)

FOREIGN PATENT DOCUMENTS

| DE | 2429553 A1 | 1/1976 |
| DE | 3127848 A1 | 3/1983 |

(Continued)

OTHER PUBLICATIONS

A Fully Certified English Translation George Dose (Pub. No. DE 3231386 A1), published on Mar. 1, 1984.
(Continued)

*Primary Examiner* — Thai Ba Trieu
(74) *Attorney, Agent, or Firm* — Berenato & White, LLC

(57) ABSTRACT

A rotary internal combustion engine includes outer and inner housings defining an enclosure therebetween, and first and second side housings disposed on opposite sides of the outer housing. The inner housing is rotatable relative to the outer housing and at least two barriers divide the enclosure into a combustion chamber and an exhaust chamber. At least one barrier is rotatable relative to at least one other barrier and at least one barrier comprises a retractable barrier mounted along a pivot axis and is pivotable between an extended position and a retracted position. An intake port, exhaust port, and ignition source are also provided. The rotary internal combustion engine further includes a cylindrical stationary shaft disposed inside the inner housing and oriented substantially coaxially with the inner housing. The stationary shaft has an intake opening configured to be intermittently fluidly connected with the intake port.

25 Claims, 6 Drawing Sheets

Related U.S. Application Data continuation of application No. 13/644,705, filed on Oct. 4, 2012, now Pat. No. 8,613,270, which is a continuation of application No. 12/349,122, filed on Jan. 6, 2009, now Pat. No. 8,286,609.

(51) Int. Cl.

| | | |
|---|---|---|
| *F01C 1/00* | (2006.01) | |
| *F04C 18/00* | (2006.01) | |
| *F04C 2/00* | (2006.01) | |
| *F01C 21/08* | (2006.01) | |
| *F01C 1/32* | (2006.01) | |
| *F01C 1/40* | (2006.01) | |
| *F01C 21/10* | (2006.01) | |
| *F02B 55/00* | (2006.01) | |
| *F02B 53/10* | (2006.01) | |
| *F02B 53/12* | (2006.01) | |
| *F02B 55/14* | (2006.01) | |

(52) U.S. Cl.
CPC .............. *F01C 1/40* (2013.01); *F01C 21/104* (2013.01); *F02B 53/00* (2013.01); *F02B 53/10* (2013.01); *F02B 53/12* (2013.01); *F02B 55/00* (2013.01); *F02B 55/14* (2013.01); *F04C 2250/102* (2013.01); *Y02T 10/17* (2013.01)

(58) Field of Classification Search
CPC .......... F02B 53/10; F02B 53/12; F02B 55/00; F02B 55/14; F04C 2250/102; Y02T 10/17
USPC .............. 123/244, 248, 241, 226, 237, 235; 418/248, 246, 176, 266, 268
See application file for complete search history.

(56) References Cited

U.S. PATENT DOCUMENTS

| | | | |
|---|---|---|---|
| 1,222,475 A | 4/1917 | Sears | |
| 1,294,760 A | 2/1919 | Bowser | |
| 1,400,255 A | 12/1921 | Anderson | |
| 1,453,683 A | 5/1923 | Kochendarfer | |
| 1,601,397 A | 9/1926 | Kochendarfer | |
| 1,770,225 A * | 7/1930 | Blackman | F02B 53/00 123/229 |
| 1,790,256 A | 1/1931 | Wright | |
| 1,877,250 A | 9/1932 | Meyer | |
| 1,909,880 A | 5/1933 | Meyer | |
| 2,343,948 A | 3/1944 | Bellazini | |
| 3,008,457 A | 11/1961 | Mezzetta | |
| 3,184,022 A | 5/1965 | Olson | |
| 3,227,090 A * | 1/1966 | Bartolozzi | F01C 1/073 123/245 |
| 3,548,789 A * | 12/1970 | Creek | F02B 53/00 123/235 |
| 3,723,033 A * | 3/1973 | Tauscher | F01C 1/3442 123/243 |
| 3,902,829 A | 9/1975 | Burrowes | |
| 3,927,647 A | 12/1975 | Blackwood | |
| 3,951,109 A | 4/1976 | Chappellier | |
| 3,951,110 A | 4/1976 | Chappellier | |
| 3,976,037 A | 8/1976 | Hojnowski | |
| 4,044,596 A | 8/1977 | Luce | |
| 4,106,472 A | 8/1978 | Rusk | |
| 4,451,215 A | 5/1984 | Winkler et al. | |
| 6,688,276 B2 | 2/2004 | Baptista et al. | |
| 6,939,117 B2 | 9/2005 | Wheeler et al. | |
| 6,976,832 B1 | 12/2005 | Wheeler et al. | |
| 7,578,278 B2 | 8/2009 | Peitzke et al. | |
| 7,845,332 B2 | 12/2010 | Wang | |
| 8,061,327 B2 | 11/2011 | Zink et al. | |
| 8,286,609 B2 | 10/2012 | Hudson | |
| 8,613,270 B2 | 12/2013 | Hudson | |
| 9,394,790 B2 | 7/2016 | Hudson | |
| 2010/0170469 A1* | 7/2010 | Hudson | F01C 1/321 123/200 |

FOREIGN PATENT DOCUMENTS

| | | |
|---|---|---|
| DE | 3231386 A1 | 3/1984 |
| DE | 3338969 A1 | 5/1985 |
| DE | 3809386 A1 | 9/1988 |
| DE | 19654849 A1 | 7/1998 |
| DE | 10319895 A1 | 3/2005 |
| FR | 441478 A | 8/1912 |
| GB | 2169965 A | 7/1986 |
| JP | 59119027 A | 7/1984 |
| WO | 01/46561 A1 | 6/2001 |

OTHER PUBLICATIONS

A Fully Certified English Translation Yvonne Wenzel (Pub. No. DE 2429553 A1), published on Jan. 22, 1976.
A Fully Certified English Translation Klaus Bernau (Pub. No. DE 3809386 A1) published on Sep. 15, 1988.
A Fully Certified English Translation Simon Lahaye (Pub. No. FR 441478 A), published on Aug. 7, 1912.
A Fully Certified English Translation Albert Veveris (Pub. No. DE 3127848 A1), Published on Mar. 3, 1983.

* cited by examiner

ROTARY ENERGY CONVERTER WITH RETRACTABLE BARRIER

CROSS-REFERENCE TO RELATED APPLICATION AND CLAIM TO PRIORITY

This application is a continuation of application Ser. No. 14/107,441, filed Dec. 16, 2013, now U.S. Pat. No. 9,394,790, which is a continuation of application Ser. No. 13/644,705, filed Oct. 4, 2012, now U.S. Pat. No. 8,613,270, which is a continuation of application Ser. No. 12/349,112, filed Jan. 6, 2009, now U.S. Pat. No. 8,286,609, the disclosures of which are incorporated herein by reference and to which priority is claimed.

FIELD OF THE INVENTION

The present disclosure relates to energy producing and transferring devices and in particular, to internal combustion rotary engines and rotary energy converters.

BACKGROUND OF THE INVENTION

Internal combustion engines perform useful work by combusting a fuel and producing expanding hot gases that act directly on and thereby move parts of the engine. Typically, the steps involved in internal combustion include 1) the intake of a vaporized fuel and an oxidizer (typically air); 2) the compression of the oxidizer; 3) the ignition of the vaporized fuel and oxidizer; 4) the combustion of the fuel and the expansion of the resulting gases which act on the engine part; and 5) the exhaust of the combustion gases. A variety of types of internal combustion engines exist, including, for example, reciprocating or piston engines, rotary engines, and turbines. However, existing engines suffer from a number of drawbacks. For example, conventional engines typically include a compression step, compressing the oxidizer and, in some cases, the fuel. This compression step is energy-intensive and requires the use of considerable starting energy and of heavy components. Reciprocating or piston engines also suffer from vibration and energy losses due to the constant momentum change of the pistons as they are repeatedly accelerated, stopped, and reversed during operation of the engine. Two-stroke reciprocating engines commonly intake fluid into a chamber while that chamber is exhausting the combustion gases from the previous cycle. Thus, the intake and/or exhaust may be open during the power cycle, thereby shortening the power cycle and allowing some unburned fuel to exhaust before combustion. Four-stroke engines suffer from the disadvantage of only producing power every other cycle. Turbines also suffer from energy losses. For example, the intake process is typically open to the combustion chamber during combustion and therefore the intake must overcome the opposing pressure of combustion. Additionally, turbines typically include an open channel from intake to exhaust, and thus do not efficiently harness energy when utilizing external pressure sources.

Internal rotary combustion engines offer some advantages over other types of engines. For example, internal rotary combustion engines are typically more compact and include fewer moving parts, e.g., no valves, connecting rods, cams, and timing chains, than conventional piston engines. Rotary engines also tend to operate more smoothly since there is no reciprocating motion of the pistons. Additionally, rotary engines may have an extended power stroke rotation of the output shaft compared to piston engines. However, typical rotary engines, such as Wankel-type internal combustion rotary engines, still suffer from a number of drawbacks. For example, many conventional rotary engines leak combustion gases, which is undesirable from a fuel efficiency and environmental standpoint. Additionally, many conventional rotary engines require an energy-intensive compression step prior to ignition.

SUMMARY OF THE INVENTION

In accordance with one embodiment, a rotary internal combustion engine comprises an outer housing and an inner housing disposed within the outer housing so as to define an enclosure between an inner peripheral surface of the outer housing and an outer peripheral surface of the inner housing, the inner housing being rotatable relative to the outer housing so as to define a drive member, and first and second side housings disposed on opposite sides of the outer housing. At least two barriers are disposed in the enclosure, and at least one of the barriers is rotatable relative to at least one other barrier and at least one of the barriers comprises a retractable barrier mounted along a pivot axis and pivotable between an extended position in which the at least one retractable barrier extends into the enclosure and a retracted position in which the at least one retractable barrier retracts from the extended position. The enclosure is divided into a combustion chamber and an exhaust chamber when the at least one retractable barrier is in the extended position. The rotary internal combustion engine also includes an intake port formed in the inner housing for introducing to fluid into the combustion chamber, an exhaust port for exhausting combustion gases from the exhaust chamber, and an ignition source disposed in the combustion chamber for igniting a mixture of fuel and combustion fluid. The rotary internal combustion engine further includes a cylindrical stationary shaft disposed inside the inner housing and oriented substantially coaxially with the inner housing for delivering fluid into the combustion chamber. The stationary shall has an intake opening configured to be intermittently fluidly connected with the intake port.

In accordance with another embodiment, a rotary energy converter comprises an outer housing and an inner housing disposed within the outer housing, at least one of the outer and inner housings being rotatable relative to the other of the outer and inner housings and comprising a drive member, first and second side housings disposed on opposite sides of the outer housing, and an enclosure is defined between an inner peripheral surface of the outer housing and an outer peripheral surface of the inner housing. At least two barriers are disposed in the enclosure, at least one of the barriers is rotatable relative to at least one other barrier and at least one of the barriers comprises a retractable barrier mounted along a pivot axis and is pivotable between an extended position in which the at least one retractable barrier extends into the enclosure and a retracted position in which the at least one retractable barrier retracts from the extended position. The enclosure is divided into at least two chambers when the at least one retractable barrier is in the extended position. The rotary energy converter also includes an intake port formed in the inner housing for introducing a fluid into one of the at least two chambers, and an exhaust port formed in a top wall of the outer housing for axially exhausting fluid from another of the at least two chambers. The rotary energy converter further includes a cylindrical stationary shaft disposed inside the inner housing and oriented substantially coaxially with the inner housing. The stationary shaft has an intake opening configured to be intermittently fluidly connected with the intake port.

In accordance with another embodiment, a method of combusting a fuel in a rotary engine comprises rotating a drive member to expand a combustion chamber and substantially isolate the combustion chamber from an exhaust chamber, and introducing and combusting a combustion fluid and a fuel in the combustion chamber as the combustion chamber is expanding.

The presently disclosed rotary internal combustion engine, energy converter and method of combusting offer numerous advantages in the art. For example, the presently disclosed device is compact and efficient, and is adapted to perform multiple energy functions including harnessing energy, storing, energy, and recovering energy, and requires reduced starting energy thereby making 'idling' less desirable. The device also operates at lower temperatures than many conventional engines and may be operated with little or no additional cooling. The lower operating temperatures also may allow for pre-heating of a combustible fluid without pre-ignition, the use of lower quality fuels and the production of fewer pollutants than many conventional internal combustion engines. Additionally, the device may include lighter weight components than many conventional engines and operates with reduced back pressure, reduced exhaust noise, reduced (if not eliminated) starting energy and less vibration as compared to other engines. The device also benefits from increased intake and exhaust volumetric efficiency. The device is also adapted to create a thrust stream. The thrust stream can be harnessed under atmospheric conditions, as well as when atmospheric intake is not available. Since compression is not necessary, lower octane fuels can be used. Also, since the combustion chamber is expanding before combustion, fuel vaporization is improved, including the vaporization of hard to vaporize fuels. Advantageously, the vaporization also increases fuel efficiency, and cools the input charge and the engine. The expansion before combustion also advantageously provides the reduced pressure of a carburetor without a separate carburetor and without the intake drag of a venturi-inducing flow restriction to the intake. Similarly, the expansion before combustion may eliminate the need for a separate, high pressure fuel injector.

Other embodiments and features will become still further apparent from the ensuing, description and appended claims.

DETAILED DESCRIPTION OF THE PREFERRED EMBODIMENTS

Figure 1:
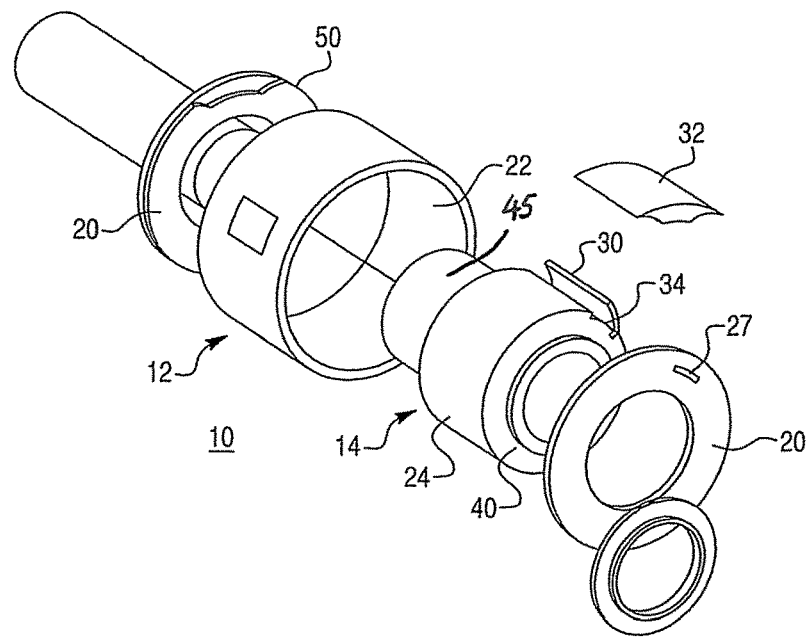
FIG. 1 is an exploded view of an embodiment of a rotary combustion engine.

Rotary energy converters according to the present disclosure may be variously configured. In many embodiments, rotary energy converters may comprise a rotary internal combustion engine 10 including an outer housing 12 and an inner housing 14 centrally disposed within the outer housing 12. A hollow enclosure 16 may be defined between an inner peripheral surface 22 of the outer housing 12 and an outer peripheral surface 24 of the inner housing 14. The housings may have a variety of configurations and in many embodiments the outer and inner housings are cylindrical. However, one or both housings may not be cylindrical, for example the outer or inner housing may comprise an ellipse or parabola or be irregularly shaped, so long as they define an enclosure between their inner and outer surfaces, respectively. Additionally, the enclosure defined between the outer and inner housings may have a variety of cross-sections. For example, in the illustrated embodiments the rotary engine includes an outer housing top wall 18 and side housings 20 disposed on opposite sides of the top wall 18 which, together with the inner housing 14, create an enclosure 16 having a rectangular cross-section. In other embodiments, the enclosure may have other cross-sections. For example, the rotary engine may not include a separate top wall and side housings and may include an outer housing having a semi-circular or parabolic shape, which together with the inner housing, define an enclosure having a semi-circular or parabolic cross-section, respectively.

In accordance with the present disclosure the housings are oriented so that at least one housing rotates relative to the other. For example, the inner housing 14 may rotate relative to a stationary outer housing 12 (in which case the inner housing may operate as a drive member), the outer housing 12 may rotate relative to a stationary inner housing 14 (in which case the outer housing may operate as a drive member), or the inner housing 14 and outer housing 12 may both rotate relative to one another, e.g., rotate in opposite directions in embodiments including side housings 20, one or both side housings may rotate or alternatively, they may be stationary. The energy from any or all of the relatively moving parts may be harnessed, for example by connecting, the moving part to a shaft and/or using the moving part as a shaft to produce work. Advantageously, the components of the presently disclosed device may rotate in more than one direction, at the same time if desired, without the use of complicated gears, which may be especially important in marine and aviation applications. Also, since the power producing structures may be cylindrical and input may occur from within the power producing structures, the device has a low frontal area, also especially important in marine and aviation applications.

The rotary engine also includes a plurality of barriers disposed in the enclosure between the outer housing and the inner housing. The barriers divide the enclosure into a plurality of chambers, e.g., combustion and exhausting chambers and may extend into the enclosure in varying amounts. For example, the barriers are preferably mounted to the surfaces defining the enclosure, e.g., the inner peripheral surface of the outer housing, the outer peripheral surface of the inner housing, and/or an inner surface of a side housing, if present. The barriers may extend substantially across the enclosure, providing little or no clearance between the barrier and an opposing surface and form a substantially closed chamber. Alternatively, the barriers may extend to a lesser degree, for example, in the case of a rotating barrier the barrier may extend only enough to provide rotation when acted on by the combustion gases).

Figure 2A:
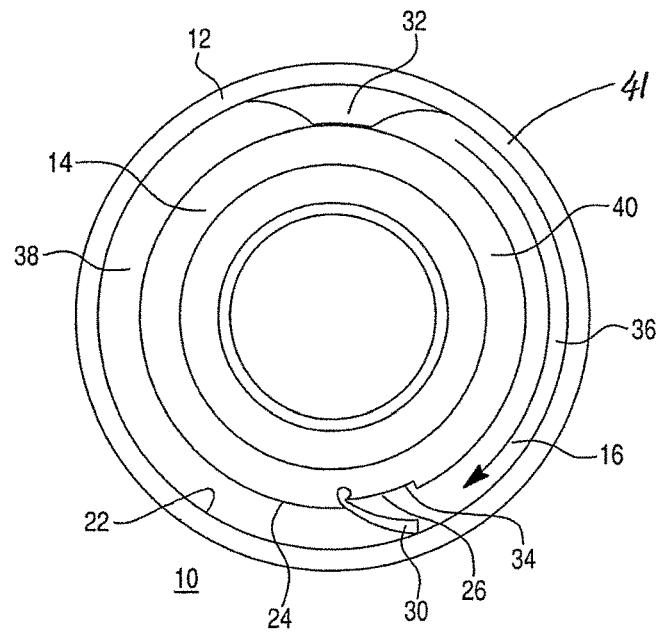
FIG. 2a is a sectional view of an embodiment of a rotary combustion engine.
Figure 2B:
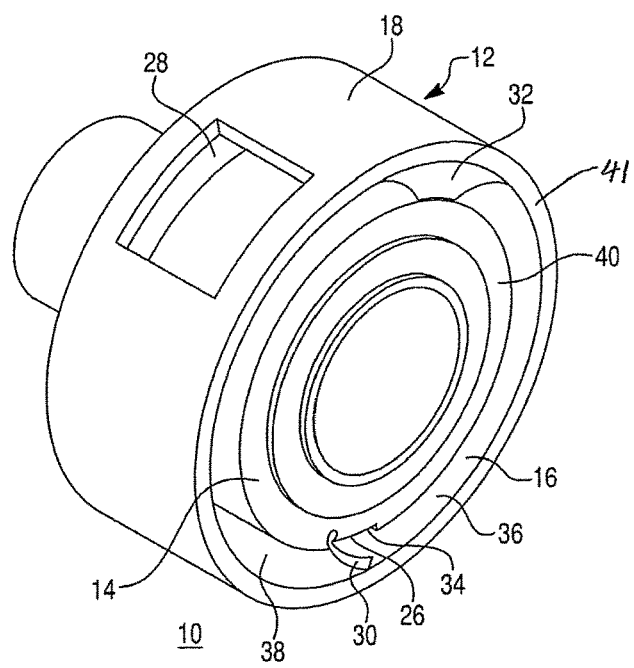
FIG. 2b is an isometric view of the rotary combustion engine of FIG. 2.
Figure 6:
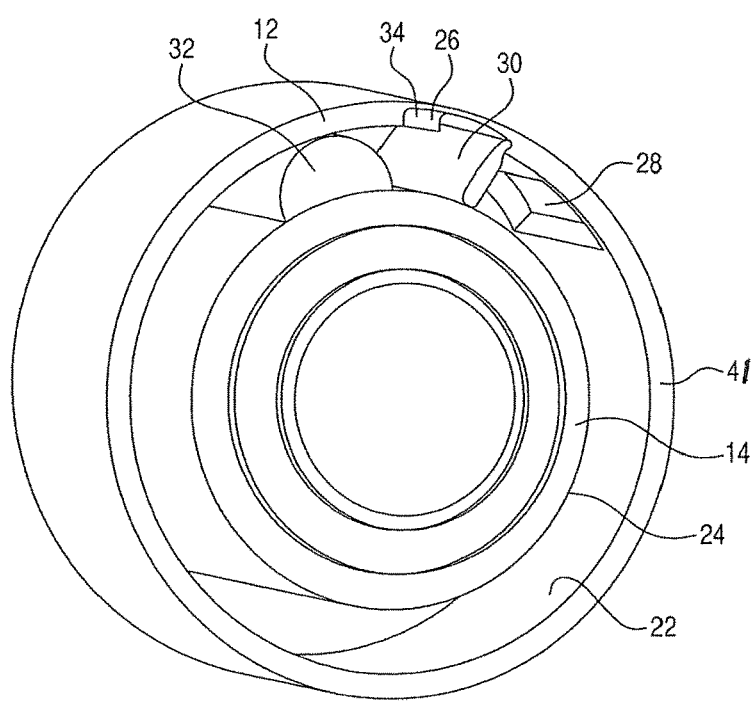
FIG. 6 is a sectional view of another embodiment of a rotary combustion engine.

The plurality of barriers includes at least one barrier arranged to rotate relative to at least one other barrier. For example, at least one barrier may be mounted to a rotatable component while at least one other barrier may be mounted to a stationary or counter-rotating, component. In some embodiments, at least one barrier may be mounted to a rotating inner housing and at least one other barrier may be mounted to a stationary or counter-rotating outer housing. In other embodiments, at least one barrier may be mounted to a rotating outer housing and at least one other barrier may be mounted to a stationary or counter-rotating inner housing. The plurality of barriers also include at least one retractable barrier which is pivotably mounted to an enclosure surface and pivots between an extended position in which the barrier extends into the enclosure and a retracted position in which the barrier retracts from the extended position. For example, as best seen in FIGS. 1 and 2, a retractable barrier 30 may be mounted to the inner housing outer peripheral surface 24 and may extend into the enclosure 16 and may retract toward the inner housing 14. Additionally or alternatively (as shown in FIG. 6), a retractable barrier 30 may be mounted to the outer housing inner peripheral surface 22 and may extend into the enclosure 16 and may retract toward the outer housing 12. In the retracted position, a retractable barrier 30 preferably retracts enough to allow the passage of another barrier (if the other barrier is rotating relative to the retractable barrier) or to pass another barrier (if the retractable barrier is rotating relative to the other barrier). In some embodiments, a retractable barrier 30 in the retracted position may lie substantially within a complementary recess 34 formed in the surface to which it is mounted. However, in other embodiments the retracted barrier may retract to a lesser degree and need not lie within a recess.

Figure 3:
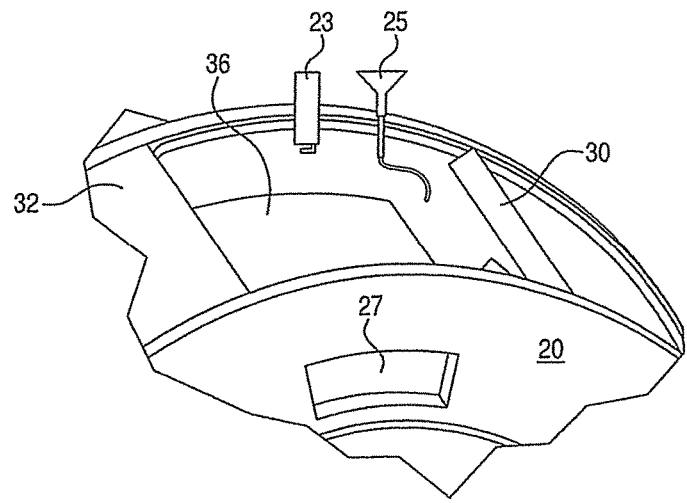
FIG. 3 is an isometric view of an embodiment of a combustion chamber.

The plurality of barriers may also include a fixed barrier, e.g., a non-pivoting barrier which does not retract from the extended position in the enclosure. For example, in the embodiments illustrated in FIGS. 1-4, the plurality of barriers comprises a fixed barrier 32 mounted to the outer housing 12 (shown detached from the outer housing in FIGS. 1 and 4 so as to be visible) and a retractable barrier 30 mounted to the inner housing. Since the fixed barrier does not retract, the retractable barrier 30 retracts in order to pass or allow passage of the fixed barrier 32. In other embodiments, and such as the embodiment illustrated in FIG. 7, the plurality of barriers may comprise two retractable barriers 30. The two retractable barriers 30 may rotate relative to one another and both retractable barriers 30 may partially retract in order to pass one another. In still other embodiments, the rotary engine may include more than two barriers, for example, three, four or even more retractable and/or fixed barriers. For example, in an embodiment illustrated in FIG. 8, the rotary engine includes two fixed barriers 32 and two retractable barriers 30. In embodiments including multiple fixed barriers, the rotary engine may also include multiple inlet ports and multiple sources of fluid. For example, as seen in FIG. 3, a source of combustion fluid, e.g., an intake opening 27 in the side housing 20, is formed in a proximate region in front of (relative to clockwise movement) each fixed barrier 32. Multiple intake ports 26 may also be formed in the inner housing 14, for example in the region of recesses 34 to intermittently communicate with a source of combustion.

Figure 1A:
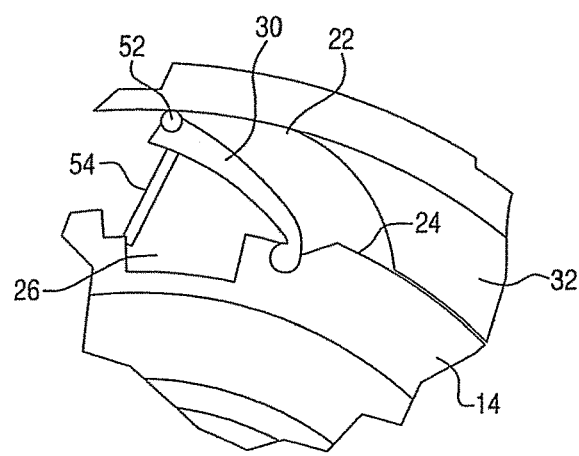
FIG. 1a is a sectional view of an embodiment of a retractable barrier.

A variety of mechanisms and combinations of mechanisms may be used to provide the pivoting movement of the retractable barrier 30. For example, the barrier 30 may be extended by centrifugal force, such as when the retractable barrier 30 is mounted on a rotating inner housing 14, or the barrier may be retracted by centrifugal force, for example when the retractable barrier is mounted on a rotating outer housing 12. The retractable bather 30 may also be retracted or extended by inertia, e.g., the inertia of its center of gravity, for example when RPM is increasing (e.g. when storing energy) or is decreasing (e.g., when recovering energy). In FIG. 1a the combined center of gravity for the retractable barrier 30 and attached rod 54 is outside the rotation perimeter when extended and is inside the rotation perimeter when retracted, thereby aiding positioning of the retractable barrier 30 when RPM is changing.

Additionally or alternatively, the barrier 30 may be extended or retracted by pressure, e.g., positive or negative pressure from above and or below. For example, as seen in FIG. 1a, a void may be present under the retracted retractable barrier 30, allowing positive or negative pressure from below to extend or retract the barrier 30. The barrier may also be retracted by contact with another barrier, for example contact with a fixed or retractable barrier. Additionally or alternatively, as shown in FIGS. 1 and 1a, one of the outer housing side walls may include a continuous cam groove 50 which receives a pin 52 on the retractable barrier 30 for providing control of the pivoting movement of the barrier 30. For example, the cam groove 50 may be formed substantially along the perimeter of the side housing until it approaches the fixed barrier 32. In order for the retractable barrier 30 to pass under the fixed barrier 32, the cam groove 52 may depart from the perimeter and follow a path corresponding to the configuration of the fixed barrier 32, as seen in FIG. 1. Advantageously, in each of these embodiments very little energy is required to extend and or retract the retractable barriers. For example, when the barrier 30 extends or retracts the center of gravity of the barrier 30 only moves a short distance, e.g., from the edge of the enclosure 16 to the center of the enclosure 16 or vice versa. Furthermore, as a retractable barrier 30 mounted to the inner housing 14 retracts, the angular velocity of the rotating component to which it is mounted is accelerated, increasing the overall efficiency of the device.

In some embodiments, and as seen in FIG. 1a, the retractable barrier 39 may also include a rod 54 which limits the extension of the retractable barrier 30. The rod 54 advantageously minimizes friction between the retractable barrier 30 and any opposing surface not moving with the retractable barrier 30 which it contacts in the extended position. Although the rod 54 is shown on the retractable barrier 30 including the pin 52 for controlling pivoting movement, it may be used on other embodiments as well. For example, the rod 54 may be used in embodiments where the retractable barrier is extended and/or retracted by centrifugal force, pressure, and/or contact with another barrier.

The retractable barriers may have a variety of configurations, in many embodiments, it may be desirable to have retractable barriers having an outer perimeter that closely matches the cross-section of the enclosure. For example, a retractable barrier extending substantially across the enclosure and having an outer perimeter that closely matches the enclosure cross-section may advantageously form a substantially closed chamber. In the illustrated embodiments including enclosures having rectangular cross-sections, a retractable barrier having a substantially rectangular perimeter may be utilized to form a substantially closed chamber. In embodiments including enclosures having other cross-sections, other retractable barrier configurations may be preferred. For example, embodiments including a semi-circular or parabolic enclosure may utilize a retractable barrier having a semi-circular or parabolic perimeter, respectively. A retractable barrier having a semi-circular configuration may provide other advantages as well. For example, a semi-circular barrier may increase the cross-section to perimeter ratio and may further reduce friction in the device. However, the retractable barriers need not have outer perimeters that match the cross-section of the enclosure so long as they can rotate within the enclosure.

The rotary internal combustion engine may also include an intake port which may communicate with a source of combustion fluid, e.g., a source of oxidizer and the hollow enclosure for introducing combustion fluid into the enclosure. In some embodiments, a fuel may also be introduced via the intake port, e.g., as a pre-mix with the combustion fluid. In other embodiments, the fuel may not be introduced via the intake port, but may be introduced via a fuel injector communicating with the combustion chamber.

Figure 4:
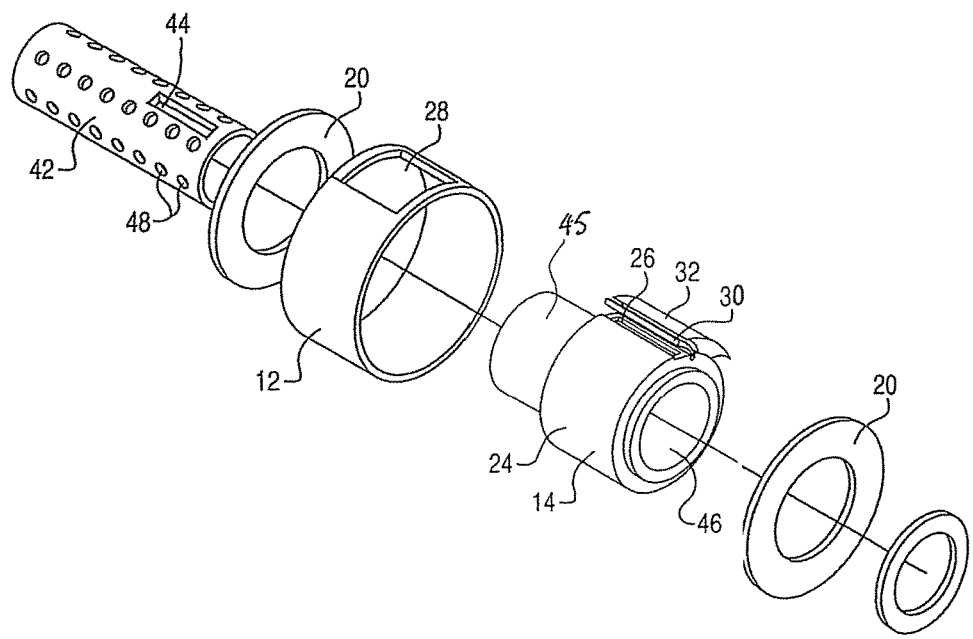
FIG. 4 is an exploded view of another embodiment of a rotary combustion engine.

In many embodiments, the intake port may intermittently communicate with the source of combustion fluid so that fluid is only intermittently introduced into the enclosure. For example, as best seen in FIG. 2a, in some embodiments the intake port 26 may be formed in the inner housing 14, for example as a recess in the sidewall 40 of the inner housing 14. The source of combustion fluid may comprise an intake opening 27 in one of the side housings 20. The side housing opening 27 may be positioned so that as the inner housing 14 rotates relative to the side housing 20, the intake opening 27 may be blocked by a sidewall 40 of the inner housing 14 (as illustrated in FIG. 2a) except when the intake port 26 overlaps the intake opening 27. In other embodiments the source of combustion fluid may be oriented within the inner housing and intermittently communicate with an intake port 26 formed in the inner housing. For example, as best seen in FIG. 4, a cylindrical stationary shaft 42 may be oriented inside the inner housing 14 and the cylindrical rotary shaft 45, for example oriented substantially coaxially with the inner housing 14 and the cylindrical rotary shaft 45. The stationary shaft 42 may include an intake opening 44 through which combustion fluid may be introduced. The intake opening 44 is configured to be intermittently fluidly connected with the intake port 26 through a complementary opening through the rotary shaft 45. As the inner housing 14 rotates, the intake opening 44 may be blocked by an inner peripheral surface 46 of the rotary shaft 45 until the intake port 26 overlaps the intake opening 44. As the intake port 26 overlaps the intake opening 44, combustion fluid may be introduced to the hollow enclosure 16 via the intake port 26. In other words, the intake opening 44 is intermittently fluidly communicating with the combustion chamber 36 through the intake port 26, in some embodiments, combustion fluid may be introduced into the enclosure via both of the above-described combustion fluid sources. Advantageously, the intake port configurations allow a large input flow cross-section increasing volumetric efficiency, as well as providing diverse input options.

The rotary engine may also include an exhaust port. The exhaust port may have a variety of configurations and may be thrilled in a number of locations. In many embodiments, and as best seen in FIGS. 1, 2, and 3, an exhaust port 28 may be formed. In the outer housing 12. For example, an exhaust port 28 may comprise an opening in the outer housing 12 which communicates with the hollow enclosure 16. Exhausting axially through the outer housing 12 advantageously reduces the backpressure in the engine by utilizing centrifugal force and thereby increasing efficiency. In some embodiments, and illustrated in FIG. 5, an exhaust port 28 may include an exhaust duct 29. The exhaust duct 29 may extend from within the hollow enclosure 16 to outside the outer housing 12 tangent to the direction of flow in the hollow enclosure 16. In many embodiments, the exhaust duct 29 may have substantially the same cross-section as the hollow enclosure 16. The exhaust duct 29 advantageously allows the combustion gases to flow from the enclosure 16 out of the exhaust 28 without changing direction and/or cross-section, allowing the drive unit to turn with more power and/or allowing a higher thrust stream.

The embodiments illustrated in the Figures will now be described in more detail. In the embodiment illustrated FIGS. 1 and 2, the rotary engine 10 includes an inner housing 14 rotatably disposed within an outer housing 12, a fixed barrier 32 mounted to the inner peripheral surface of the outer housing 22 and retractable barrier 30 pivotably mounted to the outer peripheral surface of the inner housing 24. The barriers 30, 32 extend substantially into the enclosure, i.e., only a small degree of clearance exists between the barriers and their opposing surfaces, and the retractable barrier 30 retracts to a position substantially within a recess 34 formed in the inner housing 14. However, the barriers may alternatively extend into the enclosure to a lesser degree and the retractable barrier 30 need not retract into a recess, but may simply retract in the direction of the surface to which it is mounted to a degree sufficient to allow the passage of the other barrier.

The hollow enclosure 16 is divided into a combustion chamber 36 comprising a region in front of (relative to clockwise movement) the fixed barrier 32 and behind the retractable barrier 30 and an exhausting chamber 38 comprising a region in front of (relative to clockwise movement) the retractable barrier 30 and behind the fixed barrier 32. In operation, the retractable barrier 30 is extended as it rotates with the inner housing 14 until it comes into contact with the fixed barrier 32. As the retractable barrier 30 contacts the fixed barrier 32, it moves to the retracted position and passes under the fixed barrier 32. After passing under the fixed barrier 32, the retractable barrier 30 again pivots to an axially extended position, for example, as a result of centrifugal force, pressure applied from under the retracted barrier, a pin and groove or some other combination. Advantageously, the retractable barrier 30 moves with its attached enclosure surface, the inner housing 14 thereby minimizing friction between moving parts of the device. In some embodiments, the side housings 20 may also rotate with the retractable barrier 30 further reducing friction in the device.

The source of combustion fluid may comprise an intake opening 27 formed in one of the side housings 20 which may intermittently communicate with the hollow enclosure 16 to introduce combustion fluid into the enclosure. For example, the intake opening 27 may be positioned so that as the inner housing 14 rotates relative to the side housing 20, the intake opening 27 is blocked by a sidewall of the inner housing 14 except when the recess 34 overlaps the intake opening 27. As the recess overlaps the intake opening 27, the recess forms an intake port 26 allowing the introduction of combustion fluid into the hollow enclosure 16. Fuel may also be introduced with the combustion fluid via the intake port 26, or as shown in FIG. 3, a fuel injector 25 may introduce fuel to the enclosure 16. As the recess 34 moves beyond the intake opening 27, the hollow enclosure 16 is again isolated from the combustion fluid source. The intake opening 27 is also preferably formed in a proximate region in front of (relative to clockwise movement) the fixed barrier 32, e.g., to communicate with the combustion chamber. In this configuration, the source of combustion fluid communicates with the hollow enclosure 16 as the retractable barrier 30 returns to an axially extended position and as the combustion chamber 36 is formed. Accordingly, the combustion chamber 36 may be substantially isolated during the intake stage, so that the intake does not have to overcome the pressure of combustion. As the combustion fluid is introduced, the inner housing 14 continues to rotate, moving the retractable barrier 30 forward and expanding the combustion chamber 36 and providing a lower pressure environment due to the combustion chamber 36 expansion. This expansion allows for increased vaporization and thereby unmoved combustion, as well as allowing for the use of harder to vaporize fuels. Furthermore, since the chamber is not contracting after intake, e.g., the fluid is not being compressed, lower octane fuels may be used and increased vaporization obtained. When the source of combustion fluid no longer communicates with combustion chamber 36, combustion may occur in a closed or substantially closed chamber, efficiently utilizing the combustion. As seen in FIG. 3, an ignition source 23, e.g., a spark plug, may be present in the combustion chamber 36 to ignite the fuel mixture and initiate combustion. The combustion chamber 36 continues to expand after combustion, e.g., via the continued rotation of the inner housing, until the retractable barrier 30 has made a revolution and again contacts the fixed barrier 32. Advantageously, this continuing expansion of the combustion chamber 36 and expansion of the fluid mixture provides a cooling effect allowing the engine 10 to operate at reduced temperatures. The absence of a compression step provides additional advantages as well. For example, the operation of the device is less energy intensive, allowing for low-energy idle, reduced (if not eliminated) starting energy and the use of components made from lighter materials. Additionally, because combustion is expanding tangent to rotation, the device also operates with less vibration and can operate under increased loads, as compared to many conventional engines. For example, piston engines operating under a high load may experience abrupt movements known as "bucking", a difficulty which may be avoided with the presently disclosed device. "Bucking", a significant vibration, usually occurs under high loads and/or low rpm when two connected parts are not acting in the same direction, e.g. a piston and a crankshaft.

The exhaust port 28 may be located in the outer housing top wall 18 in a region at or behind (relative to clockwise movement) the fixed barrier 32. In operation, the exhaust port 28 may communicate with the hollow enclosure 16 during the revolution of the inner housing 14. For example, starting when the combustion chamber 36 is formed, e.g., as the retractable barrier 30 passes the fixed barrier 32 and returns to an axially extended position, the exhaust port 28 is in communication with the exhausting chamber 38. The exhaust port 28 remains in communication with the exhausting chamber 38 until the retractable barrier 30 passes the exhaust port 28 bringing the combustion chamber 36 into communication with the exhaust port 28. Thus, the combustion gases from each previous combustion cycle may be continually exhausted, thereby reducing backpressure and increasing efficiency.

In another embodiment, best seen in FIG. 4, the engine 10 may be configured similarly to the above-described embodiment but the intake port 26 may comprise an opening extending through the inner housing 14, for example, from an inner peripheral surface 46 of the rotary shaft 45 to the outer peripheral surface 24 of the inner housing 14. The stationary shaft 42 may be oriented inside the inner housing 14, for example oriented substantially coaxially with the inner housing 14, and may include the shaft opening 44 through which combustion fluid may be introduced. As the inner housing 14 rotates, the shaft opening 44 may be blocked by the inner peripheral surface 46 of the rotary shaft 45 until the intake port 26 overlaps the opening 44. As the intake port 26 overlaps the opening 44, combustion fluid may be introduced to the hollow enclosure 16 via the intake port 26. Introducing the combustion fluid through the centrally located shaft offers a number of advantages. For example, as seen in FIG. 4, the stationary shaft 42 may also include a plurality of additional openings 48, e.g., holes through which combustion fluid may flow to create a fluid bearing effect between the stationary shaft 42 and inner housing 14. Additionally or alternatively, conventional friction reduction methods, e.g. bearings, lubricants etc. may be used. In other embodiments, the combustion fluid may not be introduced through the shaft 42, but the stationary shaft 42 may include the plurality of openings 48 through which combustion fluid may flow to create a fluid bearing effect. In the embodiment shown in FIG. 4, some of the openings 48 will overlap the intake port 26 after intake and during combustion so that the combustion chamber is not completely isolated from the intake during combustion. However, in some embodiments the stationary shaft 42 may not include the openings 48 located in the region which overlaps the intake port 26. Additionally, the centrifugal force acting on the fluid between the stationary shaft 42 and inner housing 14 may accelerate the fluid, drawing, fluid through the opening 44. Opening 44 may also operate as exhaust by positioning opening 44 to overlap port 26 during exhaust instead of during intake.

Figure 6A:
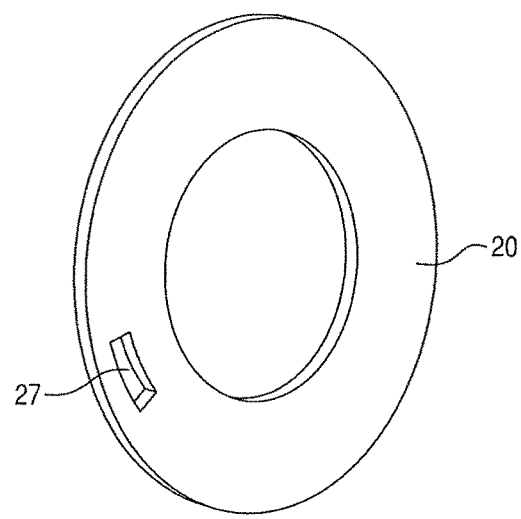
FIG. 6a is an isometric view of an embodiment of a side housing.

In another embodiment illustrated in FIGS. 6 and 6a, the rotary engine may be configured similarly to the embodiment illustrated in FIGS. 1 and 2, but the rotary engine 10 may include an outer housing 12 rotatably disposed around an inner housing 14. The outer housing 12 may be a shaft and/or connected to a shaft (not shown) for producing work. A fixed barrier 32 may be mounted to the inner housing 14 and a retractable barrier 30 may be mounted to the inner peripheral surface of the outer housing 22. The retractable barrier 30 may pivot between an axially extended position in which it extends into the hollow enclosure 16 and a retracted position in which it lies substantially within a recess 34 formed in the inner peripheral surface of the outer housing 22. In operation, the retractable barrier 30 rotates with the rotation of the outer housing 12 in the extended position until it comes into contact with the fixed barrier 32. As the retractable barrier 30 contacts the fixed barrier 32, it moves to the retracted position and passes under the fixed barrier 32 and after passing under the fixed barrier 32, the retractable barrier 30 again pivots to an axially extended position.

The source of combustion fluid may comprise an intake opening 27 formed in one of the side housings 20 (shown in FIG. 60 and the intake port 26 may be formed in the outer housing 12, for example in a side wall 41 of the outer housing 12. In many embodiments the recess 34 may operate as an intake port 26, in operation, as the outer housing 12 rotates, the opening 27 may be blocked by the sidewall 41 of the outer housing 12 until the intake port 26, e.g., the recess 34 overlaps the intake opening 27. As the intake port 26 overlaps the intake opening 27, the hollow enclosure 16 may be open to the source of combustion fluid which may be introduced through the intake port 26. As the intake port 26 moves beyond the intake opening 27, the hollow enclosure 16 is again closed to the intake combustion fluid stream.

Figure 5:
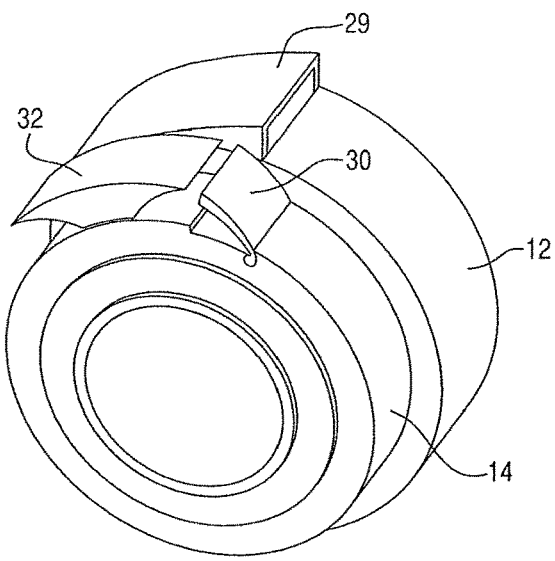
FIG. 5 is an isometric view of embodiment of a rotary combustion engine including an exhaust duct.

The exhaust port may be formed in the outer housing top wall 18 and/or in one of the side housings 20. For example, in some applications it may be desirable to utilize a rotating exhaust stream, in which case an exhaust port formed in the rotating outer housing top wall 18 or in the form of an exhaust duct as illustrated in FIG. 5 may be desired. In other embodiments, it may be preferred to utilize a stationary exhaust port in which case the exhaust port 28 may be located in one of the side housings 20, in order to achieve a substantially closed combustion chamber, the exhaust port is preferably located after (in the direction of rotation) the retractable barrier 30. Additionally, it may be desirable to utilize multiple exhaust ports, for example to increase the volumetric efficiency of the exhaust, in which case exhaust ports may be formed in both the outer housing and a side housing.

Figure 7:
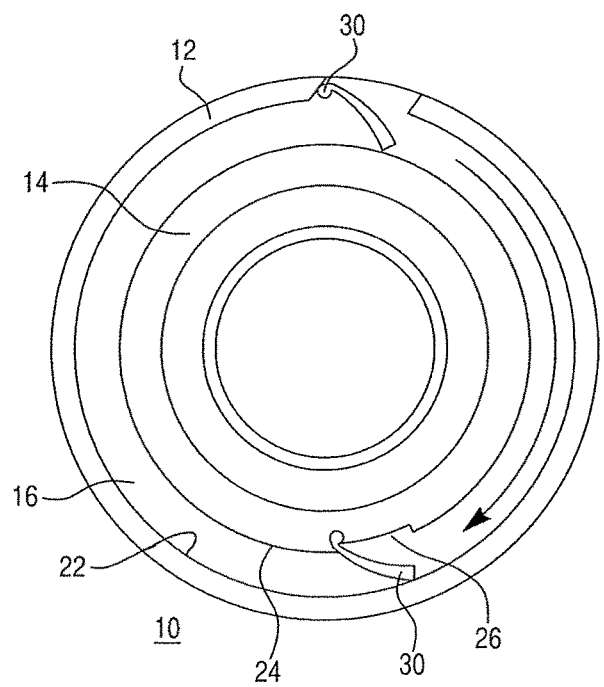
FIG. 7 is a sectional view of an embodiment of a rotary combustion engine.

In another embodiment illustrated in FIG. 7, the rotary engine may include two retractable barriers and may not include a fixed barrier. For example, the engine 10 may include a retractable barrier 30 pivotably mounted to the inner housing 14 and another retractable barrier 30 pivotably mounted to the outer housing 12. In the illustrated embodiment, the retractable barrier 30 mounted to the inner housing 14 may rotate in the extended position relative to the extended barrier 30 mounted to the outer housing 12. Centrifugal force may extend the barrier 30 mounted to the inner housing 14 and other means, for example pressure from below may be used to extend the retractable barrier 30 mounted to the outer housing 12. The barriers 30 may retract, e.g., partially retract, as the rotating retractable barrier passes and contacts the non-rotating retractable barrier. In other embodiments, the outer housing retractable barrier ma rotate or both barriers may rotate, e.g., in opposite directions, in the extended position and retract, e.g., partially retract as they pass each other. The intake port 26 and exhaust port(s) 28 may be configured in accordance with any of the above-described embodiments.

Figure 8:
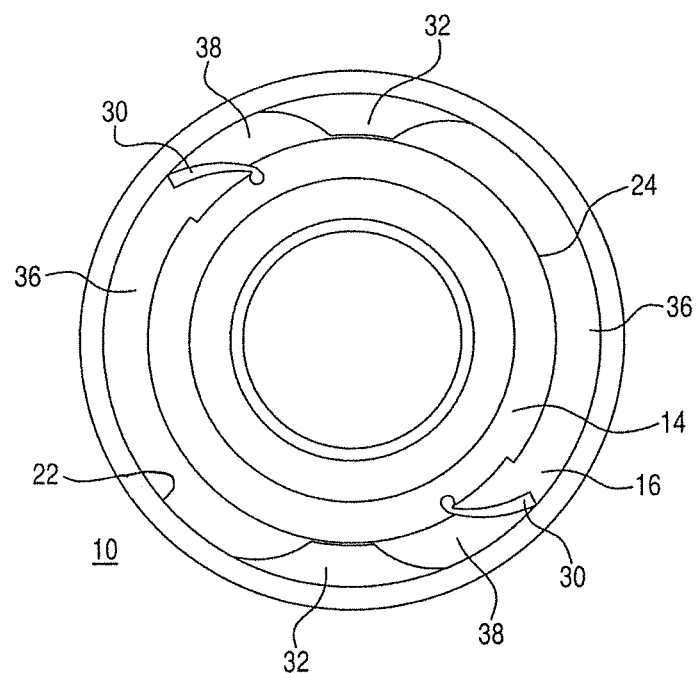
FIG. 8 is a sectional view of an embodiment of a rotary combustion engine.

In another embodiment illustrated in FIG. 8, the rotary engine 10 may be configured similarly to the embodiments illustrated in FIG. 1-2 or 3, but may include two retractable barriers 30 and two fixed barriers 32. The two retractable barriers 30 may be pivotably mounted to the inner housing 14 and the fixed barriers 32 may be mounted to the inner peripheral surface of the outer housing 22. In the axially extended position, the two retractable barriers 30 and the two fixed barriers 32 may divide the hollow enclosure 16 into two combustion chambers 36 and two exhausting chambers 38. Two sources of combustion fluid and two intake ports may provide fluid to each combustion chamber. For example, in the illustrated embodiment, openings 27 formed in the side housing 20 in front of (relative to clockwise movement) each fixed barrier comprise a source of combustion fluid for each combustion chamber. Recesses 34 under each retractable barrier 30 may operate as intake ports and intermittently communicate with the openings 27 to introduce combustion fluid into the combustion chambers. Additionally or alternatively, the source of combustion fluid may be disposed within the inner housing and the intake port may be formed in the inner housing, for example, in accordance with the embodiment illustrated in FIG. 4.

In addition to multiple combustion chambers formed in a single enclosure, in some embodiments, multiple combustion chambers may be positioned longitudinally along the axis. For example, a plurality of enclosures according to the present disclosure including one or more combustion chambers may be oriented along a common axis. In some embodiments the intake ports for the plurality of enclosures may be offset from one another, so that the cycles of the enclosures are offset, allowing for a self-start of an engine.

Rotary engines may combust fuels using a variety of methods. In accordance with one embodiment, a combustion fluid may be introduced into a combustion chamber as the combustion chamber is expanding. For example, using the embodiment shown in FIGS. 1 and 2 for reference, a combustion fluid may be introduced into the combustion chamber 36 through the opening 27 and intake port 26. As the fluid is introduced, the inner housing 14 continues to rotate and the retractable barrier 30 continues to move forward, thus expanding the combustion chamber 36. A fuel may be introduced into the combustion chamber with the combustion fluid, e.g., as a pre-mix, or fuel may be introduced directly into the combustion chamber, e.g. as fuel injection. Advantageously, the expanding combustion chamber 36 allows for increased vaporization of fuel in the combustion chamber and allows for the use of harder to vaporize fuels and lower octane fuels. In many embodiments, the combustion fluid and fuel mixture within the combustion chamber may be ignited as the chamber 36 continues to expand. For example, as the retractable barrier 30 continues to move forward and the combustion chamber 36 continues to expand, the fluid mixture in the combustion chamber 36 may be exposed to an ignition source. The ignition of the vaporized fuel produces combustion gases which push the retractable barrier 30 forward moving the inner housing 14 (or in some embodiments the outer housing 12). The forward motion of the retractable barrier 30 also pushes any fluid from the previous cycle (exhaust) in front of the retractable barrier 30, e.g., in the exhausting chamber 38 and out through the exhaust port 28. After the combustion of the fuel, the combustion chamber 36 may communicate with the exhaust port 28, exhausting any combustion gases from the combustion chamber 36. For example, the combustion chamber 36 may communicate with the exhaust port 28 as the retractable barrier 30 approaches the fixed barrier 32. As the retractable barrier 30 approaches or contacts the fixed barrier 32, the retractable barrier 30 may move to an axially retracted position. In the retracted position, the retractable barrier 30 passes under the fixed barrier 32; the cycle then starts again and is repeated as described above.

Although the above-described embodiments utilize combustion gases to drive the retractable barrier and drive member forward, the invention is not so limited. In some embodiments, other sources of pressure, including but not limited to geo-thermal pressure, hydraulic pressure, and steam pressure may be utilized. In these embodiments, the pressurized fluid drives the retractable barrier forward to expand into the enclosure volume similar to the pressurized fluid in a reciprocating steam engine, in these embodiments, the duration of overlap between the intake port and fluid source opening and/or the size of the intake port and/or fluid source openings may be increased to sustain the pressure. Additionally or alternatively, other intake port configurations may be utilized. Advantageously, the present device allows the enemy of the pressurized fluid to be efficiently harnessed without the energy losses due to the reciprocating mass found in reciprocating/piston configurations. Additionally, the retractable barrier effectively closes the expanding chamber in contrast with turbines which typically include an open channel for the pressurized fluid to expand/flow by simply following an opal channel from intake to exhaust when external pressure is applied.

In some embodiments, the device may be operated as a pump. For example, the device may operate as a fluid pump for negative pressure, e.g., for fluid in the first chamber and/or for positive pressure, e.g., for fluid in the second chamber. In these embodiments, one end of the pressure chamber is closed. If used for negative pressure, the "expanding" end of the first chamber, e.g., at the retractable barrier is substantially closed creating an efficient vacuum and negative pressure. If used for positive pressure, the "contracting" end of the second chamber is substantially closed, and the fluid is efficiently forced to move and/or pressurize under pressure. Advantageously, the presently disclosed device operates efficiently as a pump without the energy losses and vibration of reciprocating/piston pumps, and with the closed end that is lacking in turbine pumps.

The present device may also be efficiently utilized as a flywheel to store energy. In these embodiments, the retractable barrier may be maintained in a retracted position to reduce any resistance to acceleration and/or to movement, thus increasing efficiency. For example, in some embodiments pressure may be used to extend the barrier, and in these embodiments the retractable barrier may be maintained in a retracted position using negative pressure. Alternatively, in some embodiments, such as those utilizing an intake port on the outer housing top wall, centrifugal force may be utilized to maintain the retractable barrier in a retracted position.

In some embodiments, the exhaust may be harnessed to produce work. For example, the exhaust may be used to drive a turbine. In other embodiments propellers or foils may be directly attached to the drive member. Additionally, the exhaust may be used by itself to drive other energy conversion devices or to create a high pressure air flow, e.g. a thrust stream. Advantageously, the presently disclosed device may be effectively and efficiently used to create a thrust stream in both atmospheric use, i.e. using atmospheric intake, and non-atmospheric use, i.e., using 'rocket' fuel, unlike many conventional devices. In an embodiment using the device to create a thrust stream, the device may include an exhaust duct with the same cross-section as the enclosure to increase volumetric efficiency. For example, the exhaust duct on the exhaust side may provide a constant exhaust stream cross-section from inside the enclosure to outside the enclosure, so that the exhaust cross-section does not have to change as the exhaust exits the device. Additionally, exhaust direction does not have to change as it is still tangent to the direction of flow in the enclosure. Furthermore, thrust vectoring may be achieved by rotating the device on its operating axis to essentially rotate the exhaust point.

The presently disclosed rotary energy converters effectively and efficiently harness energy in a number of ways. For example, in some embodiments the rotation of the device retracts the retractable barrier, and thus the energy that was used to extend the retractable barrier may be put back into the system due to the conservation of angular momentum. The retractable barrier also travels a shorter distance than many movable devices used for creating a cross section barrier, since the barrier center of gravity moves from approximately on an enclosure interior surface to approximately halfway across the enclosure. In embodiments where the device comprises an internal combustion engine, the combustion chamber is substantially closed and the combustion pressure pushes the retractable barrier and efficiently harnesses the combustion energy. Additionally, in accordance with the present disclosure the intake process may not be exposed to the pressure of combustion since the combusted fluids from the previous cycle may have been substantially exhausted from the enclosure at the intake, and combustion may be delayed until the intake is closed. As another advantage, the pressurized fluids apply a force to the bathers directly in a line of motion (a tangent line) of the driven device, thereby efficiently harnessing the combustion pressure. This is in contrast to, for example, connecting rods, where the pressure is applied at an angle to the tangent. Additionally, the present invention produces power on every cycle without having the chamber open to the exhaust and intake at the same time.

In some embodiments the present device may be accelerated to brake or slow another device and the presently disclosed device may be used to store the braking energy by storing pressure, e.g., positive and/or negative and/or by use as a flywheel. Thus, regenerative braking, e.g., storing, energy, and engine power, e.g., harnessing energy may be accomplished with the same device. The energy may then be used, e.g., recovering energy, the same as when used as an engine. In contrast, most regenerative braking configurations require separate energy harnessing, storage, and recovery devices. Furthermore, essentially all of the rotating engine mass would store flywheel, energy, making excellent use of the engine mass and cost. The low starting energy also makes engine shutoff/restart (for fuel consumption, pollution and noise benefits) more feasible. Indeed the invention could be configured to have a combustion chamber situated in the ignition position wherever the engine stops, e.g. if multiple chambers and/or enclosures were used, allowing a self-start. Alternatively, for a single combustion chamber, other means could be used, such as pressure to allow a self-start. In either case self-starting is assisted because of the low starting energy and because "bucking" is reduced by lack of compression and fluid pressure applied tangent to rotation.

The presently disclosed device offers numerous other advantages as well. For example, the present device has few moving parts and reduces complexity compared to many systems used for similar purposes. In some embodiments, the combustion gases may be exhausted axially outward and aided by centrifugal force, thereby reducing backpressure and increasing output. Furthermore, the combustion gases, retractable barrier, and exhaust all flow in the same direction further increasing the efficiency of the device. If braking is accomplished without using the flywheel aspect, then energy could be stored without increasing rpm, thereby decreasing wear.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A rotary energy converter, comprising:
   an outer housing and an inner housing disposed within the outer housing so as to define an enclosure between an inner peripheral surface of the outer housing and an outer peripheral surface of the inner housing, the inner housing being rotatable relative to the outer housing so as to define a drive member;
   first and second side housings disposed on opposite sides of the outer housing;
   at least two barriers disposed in the enclosure, at least one of the barriers being rotatable relative to at least one other barrier and at least one of the barriers comprising a retractable barrier mounted along a pivot axis and being pivotable between an extended position in which the at least one retractable barrier extends into the enclosure and a retracted position in which the at least one retractable barrier retracts from the extended position, the enclosure being divided into at least two chambers when the at least one retractable barrier is in the extended position;

an intake port formed in the inner housing for introducing a fluid into one of the at least two chambers;

a cylindrical stationary shaft disposed inside the inner housing and oriented substantially coaxially with the inner housing; and an exhaust port formed in a top wall of the outer housing for axially exhausting fluid from another of the at least two chambers;

wherein the cylindrical stationary shaft has an intake opening configured to be intermittently fluidly connected with the intake port.

2. The rotary energy converter according to claim 1, further comprising an exhaust duct extending from within the enclosure to outside the outer housing in a direction tangent to flow in the enclosure.

3. The rotary energy converter according to claim 1, further comprising an exhaust duct extending from within the enclosure to outside the outer housing having a cross-section substantially the same as the enclosure cross-section.

4. The rotary energy converter according to claim 1, wherein the outer and inner housings rotate in opposite directions.

5. The rotary energy converter according to claim 1, wherein at least one of the barriers is mounted to one of the side housings.

6. The rotary energy converter according to claim 1, wherein the at least two barriers comprise at least two retractable barriers.

7. The rotary energy converter according to claim 1, wherein the retractable barrier is mounted to the drive member and is pivotable between the extended position and the retracted position by the action of a continuous cam groove formed in one of the side housings; and wherein the retractable barrier has a pin laterally extending from the extendable barrier and engaging the continuous cam groove.

8. The rotary energy converter according to claim 1, further comprising a rod connecting the retractable barrier to the inner housing so as to limit the extension of the retractable barrier away from the inner housing.

9. The rotary energy converter according to claim 1, wherein the intake opening is configured to be intermittently fluidly connected with the intake port by intermittently overlap the intake port.

10. The rotary energy converter according to claim 1, wherein the cylindrical stationary shaft includes a plurality of holes through which combustion fluid flows to create a fluid bearing effect between the cylindrical stationary shaft and inner housing.

11. A rotary internal combustion engine, comprising:

an outer housing and an inner housing disposed within the outer housing so as to define an enclosure between an inner peripheral surface of the outer housing and an outer peripheral surface of the inner housing, the inner housing being rotatable relative to the outer housing so as to define a drive member;

first and second side housings disposed on opposite sides of the outer housing;

at least two barriers disposed in the enclosure, at least one of the barriers being rotatable relative to at least one other barrier and at least one of the barriers comprising a retractable barrier mounted along a pivot axis and being pivotable between an extended position in which the at least one retractable barrier extends into the enclosure and a retracted position in which the at least one retractable barrier retracts from the extended position, the enclosure being divided into a combustion chamber and an exhaust chamber when the at least one retractable barrier is in the extended position;

an intake port formed in the inner housing for introducing a fluid into the combustion chamber;

a cylindrical stationary shaft disposed inside the inner housing and oriented substantially coaxially with the inner housing for delivering fluid into the combustion chamber;

an exhaust port for exhausting combustion gases from the exhaust chamber; and an ignition source disposed in the combustion chamber for igniting a mixture of fuel and combustion fluid;

wherein the cylindrical stationary shaft has an intake opening configured to be intermittently fluidly connected with the intake port.

12. The rotary internal combustion engine according to claim 11, further comprising a fuel injector disposed in the combustion chamber for introducing a fuel into the combustion chamber.

13. The rotary internal combustion engine according to claim 11, wherein the at least two barriers comprise a first barrier, a first retractable barrier, a second barrier and a second retractable barrier; the first barrier extends into the enclosure and the first retractable barrier is pivotable between an extended position and a retracted position, at least one of the first barriers being rotatable relative to the other first barrier; the second barrier extends into the enclosure and the second retractable barrier is pivotable between an extended position and retracted position, at least one of the second barriers being rotatable relative to the other second barrier, wherein the enclosure is divided into first and second combustion chambers and first and second exhaust chambers with the first and second retractable barriers are extended.

14. The rotary internal combustion engine according to claim 11, wherein at least one of the side housings rotates relative to at least one of the inner and outer housings.

15. The rotary internal combustion engine according to claim 11, wherein the exhaust port is formed in a top wall of the outer housing.

16. The rotary internal combustion engine according to claim 11, further comprising an exhaust duct extending from within the enclosure to outside the outer housing in a direction tangent to flow in the enclosure.

17. The rotary internal combustion engine according to claim h further comprising an exhaust duct extending from within the enclosure to outside the outer housing having a cross-section substantially the same as a cross-section of the enclosure.

18. The rotary internal combustion engine according to claim 11, wherein the at least two barriers comprise at least two retractable barriers.

19. The rotary internal combustion engine according to claim 11, wherein the outer and inner housings rotate in opposite directions.

20. The rotary internal combustion engine according to claim 11, wherein at least one of the barriers is mounted to one of the side housings.

21. The rotary internal combustion engine according to claim 11, wherein the at least one retractable barrier pivots between an extended position and a retracted position by centrifugal force and/or the inertia of the barrier.

22. The rotary internal combustion engine according to claim 11, wherein the retractable barrier is mounted to the drive member and is pivotable between the extended position and the retracted position by the action of a continuous cam groove formed in one of the side housings; and wherein the retractable barrier has a pin laterally extending from the extendable barrier and engaging the continuous cam groove.

23. The rotary internal combustion engine according to claim 11, further comprising a rod connecting the retractable barrier to the inner housing so as to limit the extension of the retractable barrier away from the inner housing.

24. The rotary internal combustion engine according to claim 11, wherein the intake opening is configured to be intermittently fluidly connected with the intake port by intermittently overlap the intake port.

25. The rotary internal combustion engine according to claim 11, wherein the cylindrical stationary shaft includes a plurality of holes through which combustion fluid flows to create a fluid bearing effect between the cylindrical stationary shaft and inner housing.

* * * * *